(12) United States Patent
Kawano et al.

(10) Patent No.: US 6,412,174 B1
(45) Date of Patent: Jul. 2, 2002

(54) METHOD OF MANUFACTURING HEAT EXCHANGE TUBE

(75) Inventors: Makoto Kawano; Ryoji Matsunami; Tatsuya Fujiyoshi, all of Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/362,235

(22) Filed: Jul. 28, 1999

(30) Foreign Application Priority Data

Aug. 25, 1998 (JP) .......................................... 10-239175
Nov. 20, 1998 (JP) .......................................... 10-331433

(51) Int. Cl.$^7$ ................................................ B23P 15/26
(52) U.S. Cl. ........................ 29/890.053; 29/890.054; 228/183
(58) Field of Search ................................ 228/183, 223; 29/890.054, 890.053

(56) References Cited

U.S. PATENT DOCUMENTS

| 5,450,666 A | * | 9/1995 | Conn et al. ............ 29/890.043 |
| 5,456,006 A | * | 10/1995 | Study .................... 29/890.054 |
| 5,685,075 A |   | 11/1997 | Kato ..................... 29/890.054 |
| 5,765,634 A |   | 6/1998 | Martins ...................... 165/177 |
| 5,857,367 A | * | 1/1999 | Akiyama .................... 228/223 |
| 6,059,174 A | * | 5/2000 | Kojima et al. ............... 228/183 |

* cited by examiner

*Primary Examiner*—I Cuda Rosenbaum
(74) *Attorney, Agent, or Firm*—Foley & Lardner (57) ABSTRACT

During the course of bending and deforming a strip-shaped metal plate in multiple stages through use of a press roller, to thereby constitute a tube base having a closed cross section, slime-like flux is applied to solely the portions of the metal plate to be brazed, and the tube base is heated in a heating furnace, to thereby braze the portions to be brazed. Accordingly, waste of the flux is eliminated. Further, flux coating can be performed on a tube forming line, thus simplifying facilities.

17 Claims, 6 Drawing Sheets

METHOD OF MANUFACTURING HEAT EXCHANGE TUBE

BACKGROUND OF THE INVENTION

1. Field of the Invention

The present invention relates to a method of manufacturing a heat exchange tube for use with a heat exchanger employed in an automobile air conditioning system, such as a condenser, an evaporator, a heater core, or a radiator.

The present application is based on Japanese Patent Applications No. Hei. 10-239175 and 10-331443, which are incorporated herein by reference.

2. Description of the Related Art

Light metal material having good heat conductivity, such as aluminum or an aluminum alloy, is used as the material of a heat exchange tube for use in a heate exchanger, such as a condenser of an automobile air conditioning system. Particularly, there is employed a clad material comprising a base material and a brazing layer which is formed on the surface of the base material, from a metal of the same family as the base material. A tube base material is formed so as to assume a closed cross section by connecting together two sheets of tube raw material, each of which is formed from the clad material. The tube base material is heated in a heating furnace such that junctions on the circumferential surface of the tube base material; i.e., the mating faces of the sheets of tube raw material, are brazed, to thereby constitute a tube. In order to ensure brazing of tube raw material, powder flux is sprayed onto and electrostatically adheres to the side surface of the respective mating faces of the sheets of tube raw material. Alternatively, a flux solution is sprayed onto tube raw material such that flux adheres to the side surface.

Spraying of powder flux or a flux solution onto the tube raw material results in wasteful adhesion of flux to areas other than the area to be brazed and disadvantageously adds to cost. Further, splashing of flux deteriorates the working environment and stains surrounding facilities.

SUMMARY OF THE INVENTION

Accordingly, the object of the present invention is to provide a heat exchange tube manufacturing method which prevents waste of flux, deterioration of the working environment, and staining of surrounding facilities, which would otherwise be caused by splashing of flux, and which advantageously enables manufacture of a heat exchange tube by coating a tube with tube raw material on tube forming lines.

According to the present invention, there is provided a method of manufacturing a heat exchange tube. In the method, a metal plate is bent in multiple stages to thereby constitute a tube base having a closed cross section, only portions of the metal plate to be brazed is coated with slime-like flux between two of the multiple stages of the bending step, and the tube base is heated so as to braze the portions to be brazed, to thereby manufacture the heat exchange tube.

Further, an inner fin is inserted into the metal plate from an opening thereof during the bending step and after the coating step.

According to the present invention, in a process of forming a tube base of a heat exchange tube, flux is applied to solely the portions of a metal plate to be brazed, and flux is not applied to the other portions of the metal plate that do not require brazing, thus preventing waste of flux. Further, the flux is applied in the forming process on a line for forming a tube base, thereby eliminating provision of a flux coating process on another line. Accordingly, facilities required for manufacturing a heat exchange tube can be reduced, thus achieving cost cutting advantageous for manufacture.

Further, since slime-like flux is used, there can be prevented deterioration of the working environment and staining of surrounding facilities, which would otherwise be caused by splashing of flux.

In the step of forming a tube base, a corrugated inner fin is inserted into the metal plate that has been bent so as to assume a substantially U-shaped cross section, from an opening of the metal plate, thereby facilitating insertion of the inner fin. Further, the slime-like flux applied to the portions of the substantially U-shaped metal plate to be brazed is prevented from being scraped off at the time of insertion of the inner fin. Accordingly, in addition to the above-described advantageous results, the present invention yields the advantage of enabling the inner fin and the tube base to be brazed without fail.

Features and advantages of the invention will be evident from the following detailed description of the preferred embodiments described in conjunction with the attached drawings.

DETAILED DESCRIPTION OF THE PREFERRED EMBODIMENTS

Embodiments of the present invention will be described in detail by reference to the accompanying drawings.

Figure 1:
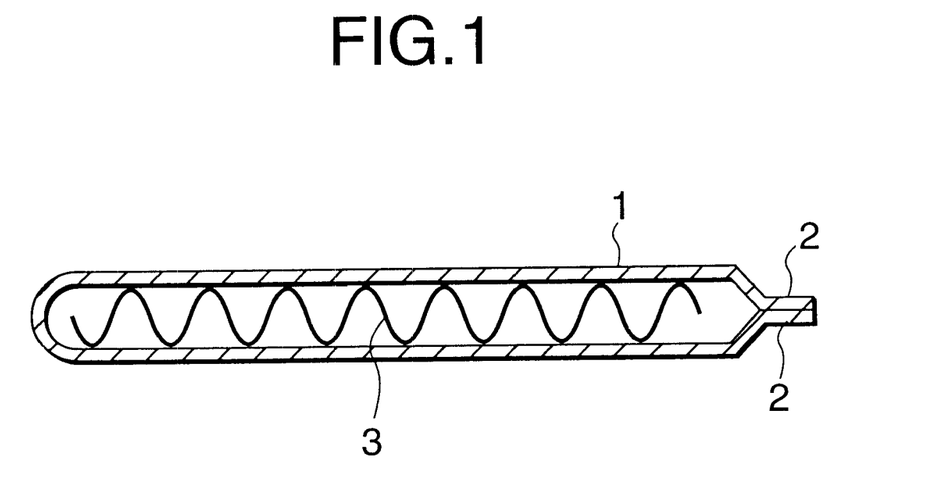
FIG. 1 is a cross-sectional view showing one heat exchange tube manufactured under a method according to the present invention.

FIG. 1 shows a flat heat exchange tube 1 used in a condenser of an automobile air conditioning system. The heat exchange tube 1 is formed so as to assume a substantially U-shaped cross section. Flanges 2, 2 provided on one side of the heat exchange tube 1 are connected and brazed together. A corrugated inner fin 3 is provided in the heat exchange tube, and the top peaks of the corrugated fin are brazed to the inner side surface of the tube 1.

Clad material is formed by laying on the surface of aluminum material, such aluminum or an aluminum alloy, a brazing layer formed from metal of the same family as aluminum. Such clad material is used as a material of the heat exchange tube 1 and the inner fin 3. In some cases, either aluminum material or the brazing layer may be employed as clad material.

Figure 2:
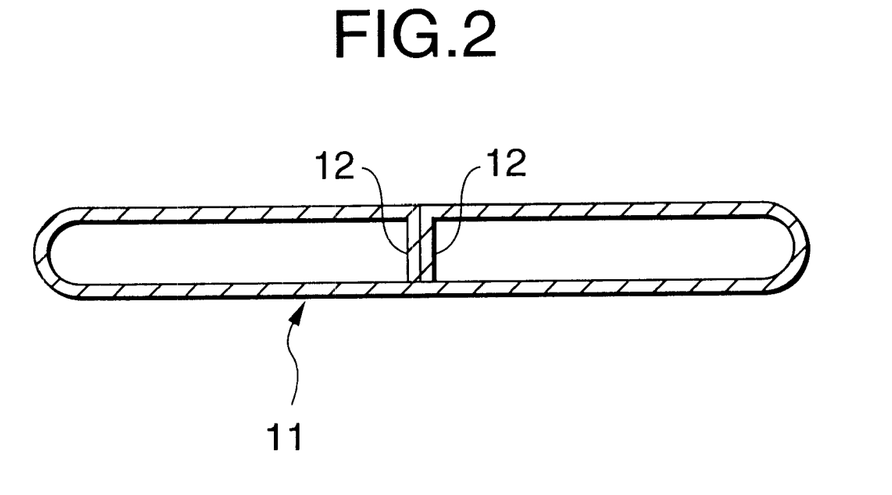
FIG. 2 is a cross-sectional view showing another heat exchange tube manufactured under a method according to the present invention.

FIG. 2 shows a flat heat exchange tube 11 used in a heater core of an automobile conditioning system. The heat exchange tube 11 is formed so as to assume a substantially B-shaped cross section. Folded flanges 12, 12 are connected together at the center of the B-shaped cross section such that their back surfaces are connected. The end face of the connected flanges 12, 12 is butt-brazed to the interior surface of the body of the tube. The clad material used for the heat exchange tube 1 according to the first embodiment is also used as material of the heat exchange tube 11 according to the second embodiment.

The flanges 2 of the heat exchange tube 1, the flanges 12 of the heat exchange tube 11, and the inner fin 3 are brazed while being heated to a required temperature by means of an unillustrated heating furnace. The heat exchange tube 1 or 11 and the inner fin 3 are brazed during their assembly into a condenser or a heater core. Specifically, a plurality of heat exchange tubes 1 or 11 are arranged, in an alternating manner, with a plurality of outer fins, the heat exchange tubes being laminated on corrugations of the corresponding outer fins, to thereby form a layered product. While the layered product and a header pipe (or header tank) are assembled together (neither the outer fin nor the header pipe is illustrated in the drawings), the heat exchange tubes 1 or 11, the outer fin, and the header pipe are brazed simultaneously.

Figure 3A:
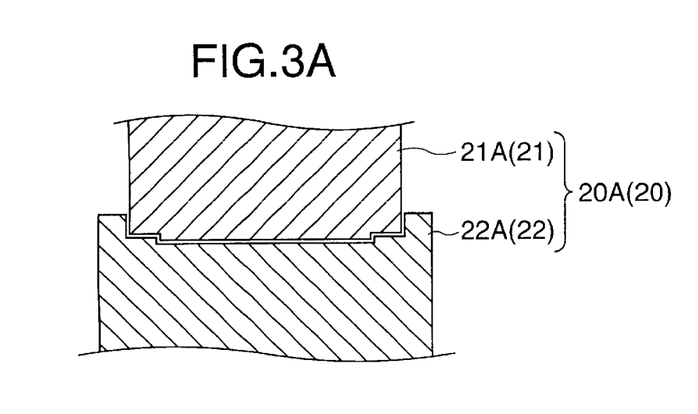
FIGS. 3A to 3D are cross-sectional views showing press rollers used in forming the heat exchange tube shown in FIG. 1.
Figure 3B:
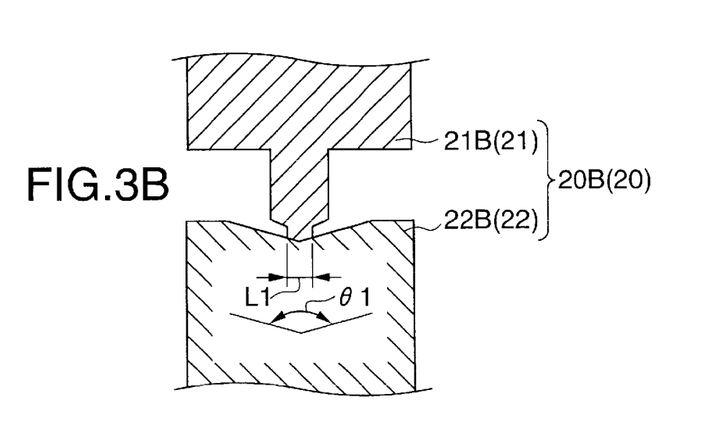
Figure 3C:
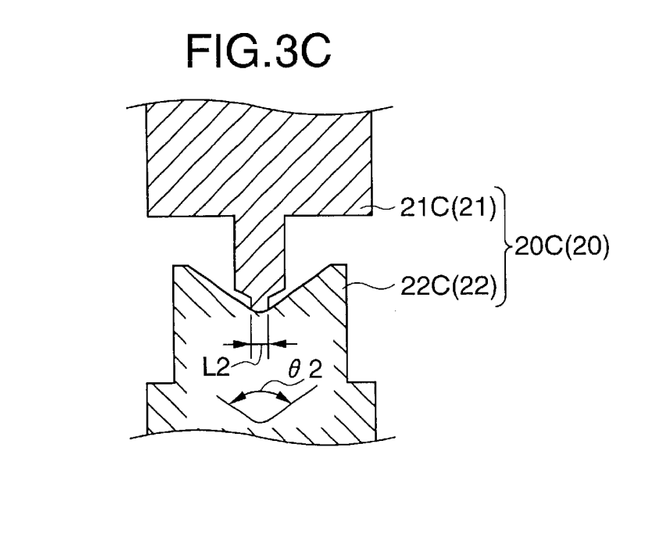
Figure 3D:
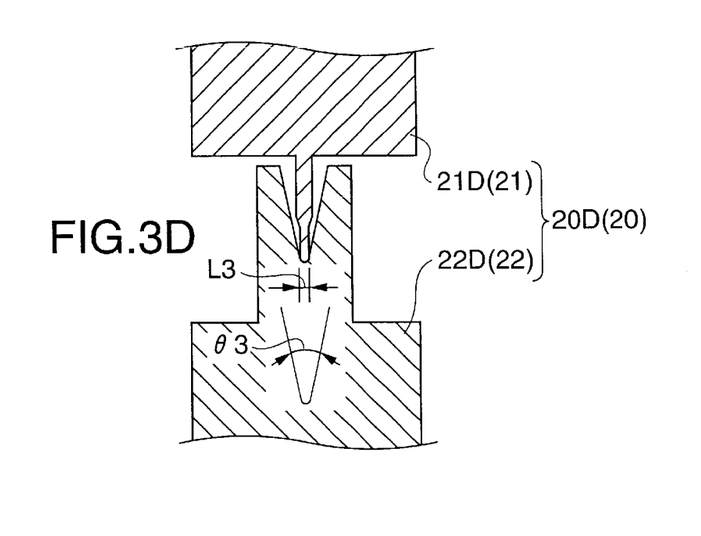

FIGS. 3A to 3D show a press roller 20 used in forming the heat exchange tube 1 according to the first embodiment. FIG. 3A shows a first press roller 20A, and FIGS. 3B to 3D show respective press rollers 20B, 20C, and 20D which are arranged so as to follow the first press roller 20A in sequence.

The press roller 20 comprises a combination of a projecting roller 21 and a recessed roller 22. Flat rollers are used for a projecting roller 21A and a recessed roller 22A of a first press roller 20A, such that flanges 2, 2 are formed along the widthwise side edges of a metal plate 10 to be described later. In connection with press rollers 20B to 20D of subsequent stages, in order to bend the metal plate 10 along its widthwise center so as to assume a substantially U-shaped cross section, opening angle $\theta_1$ of a recessed roller 22B, opening angle $\theta_2$ of a recessed roller 22C, and opening angle $\theta_3$ of a recessed roller 22D are set so as to become smaller in sequence from the roller 22B to the roller 22D. Further, width $L_1$ of a protruding portion of a protruding roller 21B, width $L_2$ of a protruding portion of a protruding roller 21C, and width $L_3$ of a protruding portion of a protruding roller 21D are set so as to become smaller in sequence from the roller 21B to the roller 21D.

Processes of manufacturing the heat exchange tube 1 using the press roller 20 will be described in sequence by reference to FIGS. 4A to 4G.

Figure 4A:
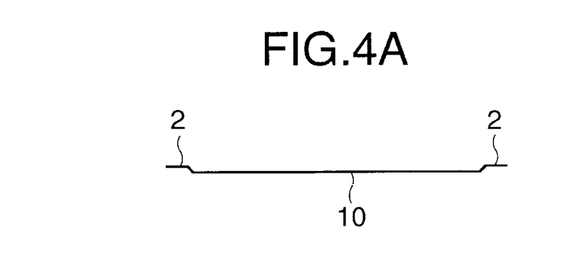
FIGS. 4A to 4G are descriptive views showing the processes for manufacturing the heat exchange tube shown in FIG. 1 in sequence.

First, as shown in FIG. 4A, a strip-shaped metal plate 10 (hereinafter referred to as "metal plate") is formed by means of the press roller 20A such that flanges 2, 2 are formed substantially horizontally along the widthwise side edges of the plate 10.

Figure 4B:
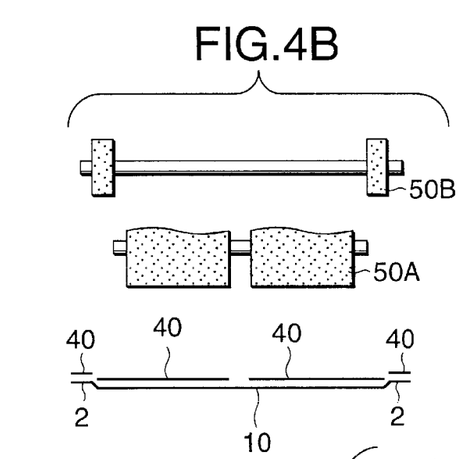

As shown in FIG. 4B, before the metal plate 10 that has been formed so as to form the flanges 2, 2 is introduced into the press roller 20B on the next stage, only the portions of the metal plate 10 to be brazed; specifically, the flanges 2, 2 and the portion of the metal plate 10 to be bonded to the inner fin 3 with the exception of the center area to be folded, are coated with flux 40.

The flux 40 is formed by uniformly dispersing or mixing fluoride-based flux consisting of 65.6 to 99.9% $KAlF_4$ and 34.4 to 0.1% $K_3AlF_6$ into synthetic resin which has fluidity at room temperature and sublimates at a temperature lower than brazing temperature—so as to constitute 40 to 70 wt. % of the flux 40.

Fluoride-based flux which is commercially available under the trade name "NOCOLOK FLUX" is used as fluoride-based flux.

Synthetic resin possesses fluidity at room temperature, depolymerizes at a temperature lower than brazing temperature (about 600° C.), and sublimates completely. For example, polybutene or acrylic acid-based resin, such as butyl acrylate, is used as synthetic resin. For example, polybutene having a mean molecular weight of 200 to 2500 can be used. The polybutene sublimates substantially completely at 450° C. and leaves no residue.

The amount of fluoride-based flux added to synthetic resin is set to 40 to 70 wt. %. The reason for this is that, when the amount of flux falls within this range, there can be produced the flux 40 which has viscosity enabling stable adherence to paint rollers 50A and 50B in FIG. 4B and a transfer region on the surface of the aluminum material without losing fluidity and which can ensure the amount of flux sufficient for brazing even when transferred in a small amount.

Figure 7:
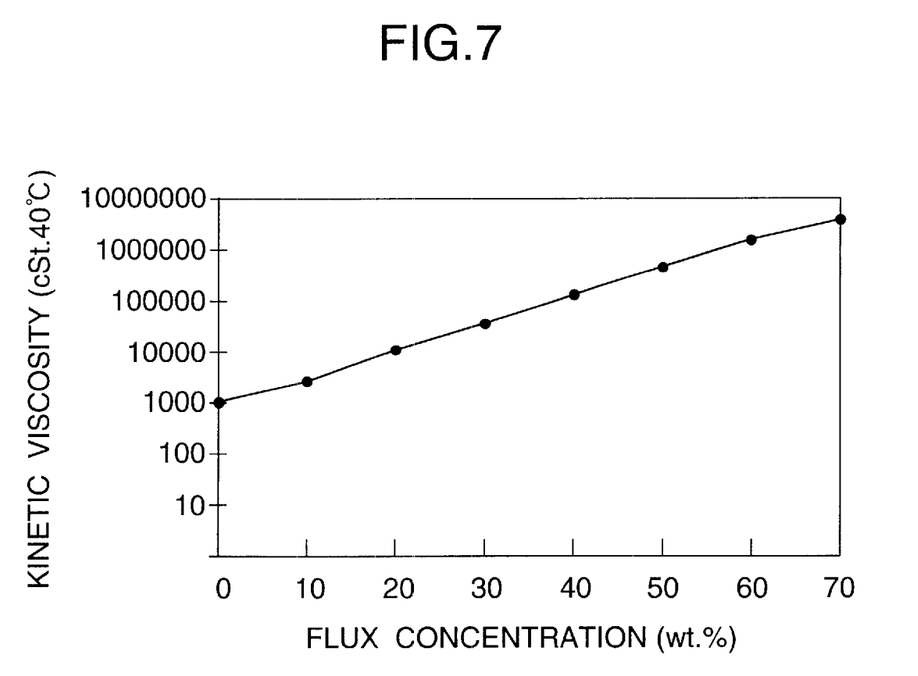
FIG. 7 is graph showing a relationship between the concentration of the fluoride-based flux included in synthetic resin and the kinetic viscosity of synthetic resin doped with the flux.

FIG. 7 shows the relation between fluoride-based flux concentration (wt. %; hereinafter referred as "flux concentration") and kinetic viscosity (cSt. 40° C.) when the fluoride-based flux is added to polybutene having a mean molecular weight of 1000, for various concentrations of the fluoride-based flux. The kinetic viscosity is increased with an increase in flux concentration, and a kinetic viscosity of 100000 cSt. (at 40° C.) can be obtained at a flux concentration of 40 wt. %. Even when fluoride-based flux becomes highly viscous at an excessive flux concentration of 50 wt. %, fluoride-based flux can be readily dispersed uniformly in synthetic resin through use of an electric agitator having stirring vanes.

The flux 40 having a kinetic viscosity of 100000 cSt. (at 40° can be applied to the paint rollers 50A and 50B without losing fluidity. The flux 40 can be stably transferred to the surface of aluminum material.

The present embodiment employs slime-like flux 40 which comprises, in proportions by weight of about 1:1, fluoride-based flux "NOCOLOK", and polybutene having a mean molecular weight of 1000. This slime-like flux 40 is uniformly applied to the required portions of the metal plate 10 through use of the paint rollers 50A and 50B.

Figure 4C:
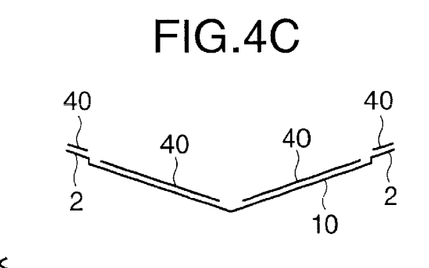
Figure 4D:
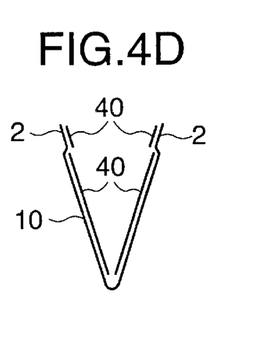
Figures 4E, 4F:
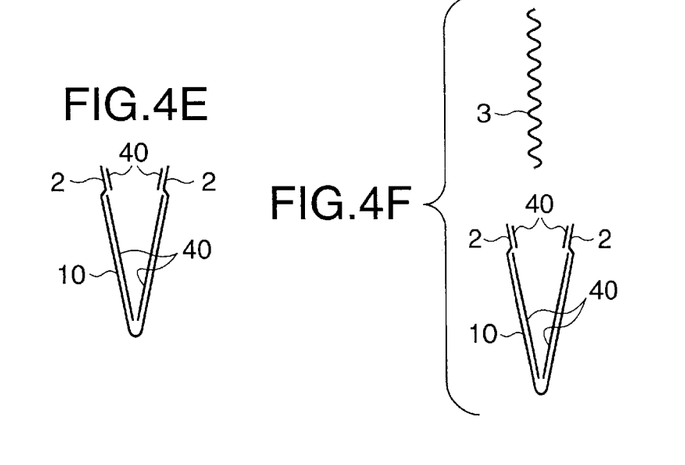

As shown in FIGS. 4C to 4E, after having been coated with the flux 40, the metal plate 10 is introduced into the press rollers 20B to 20D in sequence and is formed so as to assume a substantially U-shaped cross section.

The metal plate 10 is sequentially fed from a coil and formed so as to assume a substantially U-shaped cross section through the foregoing processes. After having been formed, the metal plate 10 is cut to a tube of predetermined length. Alternatively, the metal plate 10 that has been cut to a predetermined length may be formed so as to assume a substantially U-shaped cross section through the foregoing processes.

Figure 4G:
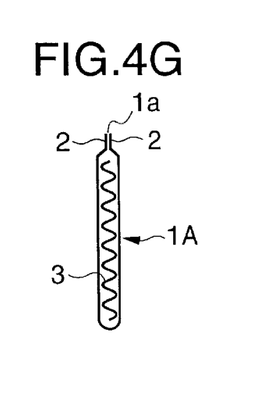

As shown in FIG. 4F, after the metal plate 10 has been formed so as to assume a substantially U-shaped cross section, the inner fin 3 that has been corrugated and cut to a predetermined length beforehand is inserted into the metal plate 10 from its opening. Subsequently, as shown in FIG. 4G, the metal plate 10 is pressed into a flat shape through use of an unillustrated press roller or a press machine, to thereby tightly hold the inner fin 3 in the metal plate 10. Further, the flanges 2, 2 are brought into close contact with each other, to thereby constitute a tube base 1A having a flat and closed cross section and a sealed portion 1a.

As mentioned previously, the tube base 1A is heated in an unillustrated heating furnace, to thereby braze the inner fin 3 and the flanges 2, 2.

Under the heat exchange tube manufacturing method according to the second embodiment, during the course of formation of the tube base 1A of the heat exchange tube 1, the slime-like flux 40 is applied to only the portions of the metal plate 10 to be brazed, and the flux 40 is not applied to the other portions of the metal 10 that do not require brazing, thus eliminating waste of the flux 40. Further, the flux 40 is applied to the metal plate 10 during the forming process on a line for forming the tube base 1A, thus eliminating a necessity for use of another line for the flux coating process. Accordingly, facilities required for flux coating operation can be simplified.

As a result, the heat exchange tube 1 can be advantageously manufactured at reduced cost.

Since slime-like flux is used as the flux 40, splashing of the flux 40 can be prevented, in turn preventing deterioration of the working environment and staining of surrounding facilities, which would otherwise be caused by splashing of the flux 40.

Particularly, the corrugated inner fin 3 is inserted into the metal plate 10 that has been folded to assume a substantially U-shaped cross section, through the open side thereof. Accordingly, the inner fin 3 can be readily inserted into the metal plate 10, and the slime-like flux 40 applied over the interior surface of the portions of the metal plate 10 to be brazed is prevented from being scraped away at the time of insertion of the inner fin 3. Consequently, the inner fin 3 and the tube base 1A can be brazed without fail.

Figure 5A:
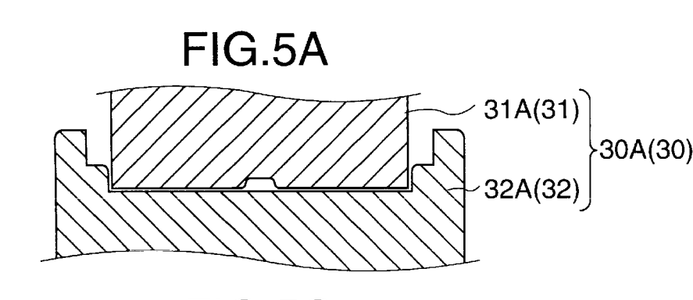
FIGS. 5A to 5E are cross-sectional views showing press rollers used in forming the heat exchange tube shown in FIG. 2.
Figure 5B:
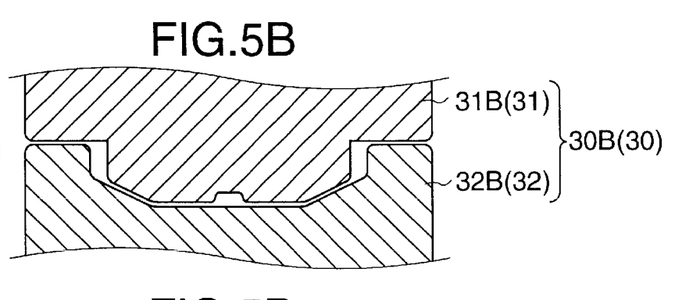
Figure 5C:
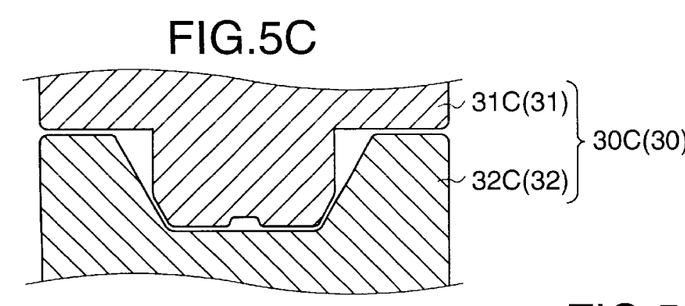
Figure 5D:
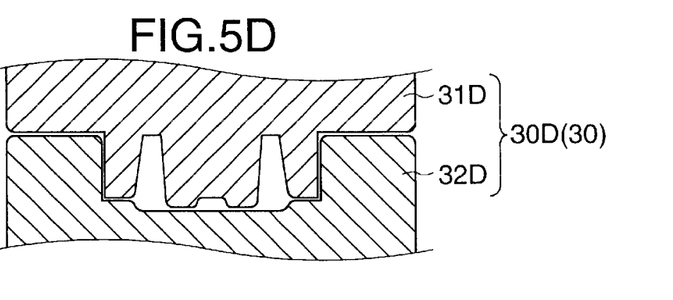
Figure 5E:
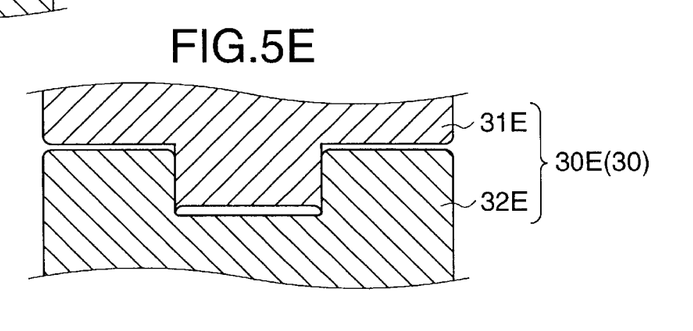

Manufacture of the heat exchange tube 11 shown in FIG. 2 involves use of a press roller 30 such as that shown in FIGS. 5A to 5E. FIG. 5A shows a press roller 30A on the first stage; FIG. 5B shows a press roller 30B on the second stage; FIG. 5C shows a press roller 30C on the third stage; FIG. 5D shows a press roller 30D on the fourth stage; and FIG. 5E shows a press roller 30E on the fifth stage.

The press roller 30 comprises a combination of a protruding roller 31 and a recessed roller 32. As will be described later, flat rollers are used as a protruding roller 31A and a recessed roller 32A of the press roller 30A on the first stage, in order to form flanges 12, 12 in upright positions along the respective widthwise side edges of the metal plate 10.

In connection with the heat exchange tube 11, in order to impart two folds to each of the sides of the metal plate 10 through forming, tapered rollers are used as protruding rollers 31B to 31D and recessed rollers 32B to 32D of intermediate-process press rollers 30B to 30D on the subsequent stages. Specifically, tapered angles of the tapered rollers are changed gradually. For a press roller 30E on the final stage, flat press rollers are used as a protruding roller 31E and a recessed roller 32E in order to form the metal plate 10 into the flat tube base 11A.

Figure 6A:
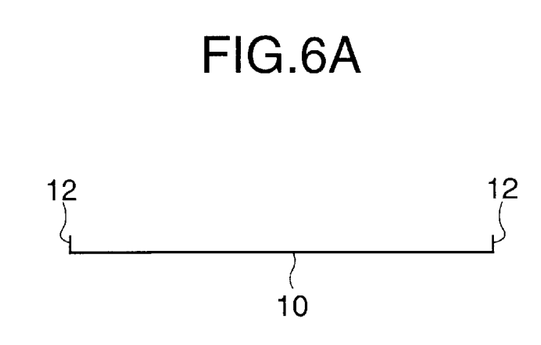
FIGS. 6A to 6F are descriptive views showing the processes for manufacturing the heat exchange tube shown in FIG. 2.
Figure 6B:
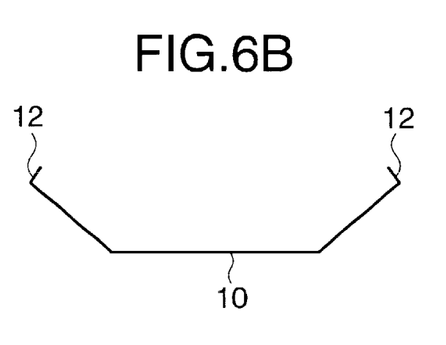
Figure 6C:
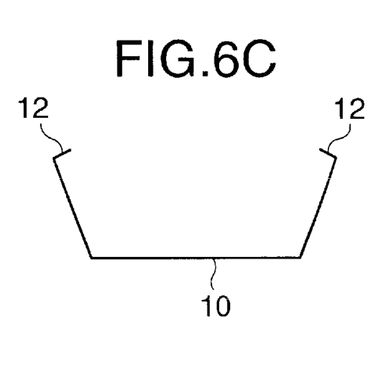
Figures 6D, 6E:
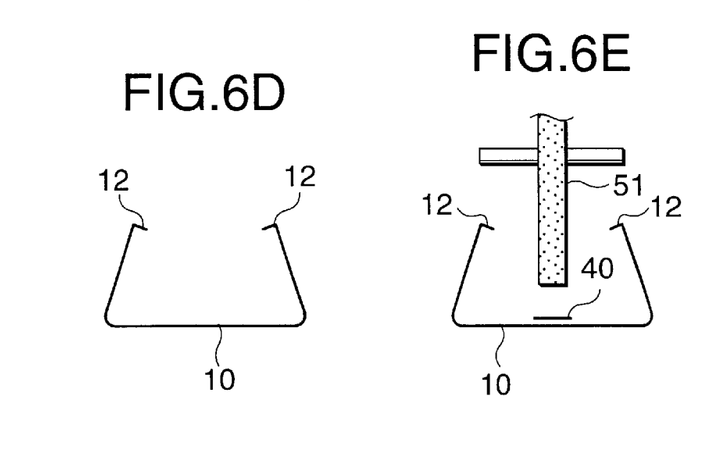

On the forming line, the metal plate 10 is gradually introduced into the press rollers 30A to 30C. As shown in FIG. 6A, the flanges 12, 12 are folded and formed in substantially upright positions along the respective side edges of the metal plate 10. As shown in FIGS. 6B and 6C, each side of the metal plate 10 is bent upwardly along a line running through positions located substantially one-fourth the overall width of the plate from the respective side edges. As shown in FIG. 6D, when the metal plate 10 is introduced into the press roller 30D, the respective bent portions are folded and formed so as to be mutually opposed.

In the process shown in FIGS. 6B to 6D for folding the respective sides of the metal plate 10 upwardly and inwardly so as to make them mutually opposed, the center of the metal plate 10 is pressed by the protruding rollers 31B to 31D. For this reason, after completion of the process shown in FIG. 6D, flux is applied to the metal plate 10. As shown in FIG. 6E, the slime-like flux 40 is uniformly applied to solely the transversal center of the metal plate 10.

Figure 6F:
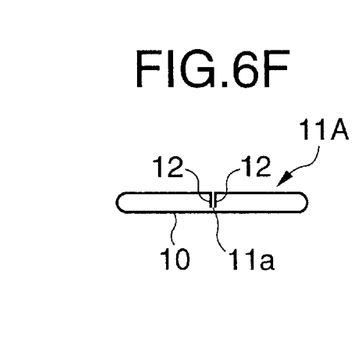

As shown in FIG. 6F, both bent portions are folded into a substantially flat state by means of a press roller 30E disposed on the final stage. The end face of each of the flanges 12, 12 is brought into pressing contact with the center portion of the metal plate 10 having the flux 40 applied thereon, to thereby constitute a flat tube base 11A having a substantially B-shaped cross section. As in the case of the tube base of the heat exchange tube 1, the base 11A is introduced into a brazing process by means of an unillustrated heating furnace, whereby the end faces of the flanges 12, 12 are brazed.

Accordingly, even in the case of manufacture of the flat heat exchange tube 11A having a substantially B-shaped cross section, waste of the flux 40 is prevented, as in the previous embodiment, and facilities can be simplified, thereby advantageously enabling inexpensive manufacture of a heat exchange tube.

Although the invention has been described in its preferred form with a certain degree of particularity, it is understood that the present disclosure of the preferred form can be d arrangement of parts without departing from the spirit and the scope of the invention as hereinafter claimed.

What is claimed is:

1. A method of manufacturing a heat exchange tube comprising steps of:

bending a metal plate in multiple stages to thereby constitute a tube base having a closed cross section;

coating with slime-like flux only portions of said metal plate to be brazed between two of the multiple stages of said bending step, said slime-like flux comprising a mixture of a fluoride-based flux with a synthetic resin, the amount of said fluoride-based flux being 40 to 70 wt. % of said mixture; and heating said tube base so as to braze the portions to be brazed, to thereby manufacture the heat exchange tube.

2. A method of manufacturing a heat exchange tube according to claim 1, further comprising a step of inserting an inner fin into the metal plate from an opening thereof during said bending step and after said coating step.

3. A method of manufacturing a heat exchange tube according to claim 1, wherein both side edges of the metal plate in a widthwise direction thereof are bent in said bending step to form flanges, and said flanges are coated with said slime-like flux in said coating step.

4. A method of manufacturing a heat exchange tube according to claim 2, wherein portions of the metal plate to be bonded to said inner fin except for a center area thereof are coated with said slime-like flux in said coating step, and the center area of said metal is bent in said bending step so as to assume a substantially U-shaped cross section, and said inner fin is inserted from an opening the metal plate bent so as to have the substantially U-shaped cross section.

5. A method of manufacturing a heat exchange tube according to claim 1, wherein said tube is simultaneously brazed with an outer fin.

6. A method of manufacturing a heat exchange tube according to claim 1, the slime-like flux is coated by means of a paint roller.

7. The method according to claim 1, wherein said metal plate is bent during said bending step with a press roller.

8. A method of manufacturing a heat exchange tube comprising:

bending a flat metal plate to thereby form a widthwise center flat part and flanges along widthwise side edges of said widthwise center flat part;

coating said flanges with a slime-like flux by a first paint roller after said bending step;

coating said widthwise center flat part, except for a widthwise center area of said widthwise center flat part, with the slime-like flux by a second paint roller after said bending step;

bending said metal plate coated with said slime-like flux at said widthwise center area of said widthwise center flat part to impart a substantially U-shaped cross section to said metal plate;

inserting an inner fin into an opening of the substantially U-shaped cross section of said metal plate;

pressing said metal plate, bent into the substantially U-shaped cross section, to contact said flanges with each other and thereby hold said inner fin by said widthwise center flat part bent at said widthwise center area; and heating said metal plate holding said inner fin therein to braze portions coated with the slime-like flux to thereby manufacture the heat exchange tube.

9. The method according to claim 8, wherein said flanges are coated with the slime-like flux by rotation of said first paint roller in a longitudinal direction of said metal plate.

10. The method according to claim 8, wherein said widthwise center flat part is coated with the slime-like flux by rotation of said second paint roller in a longitudinal direction of said metal plate.

11. The method according to claim 10, wherein said second paint roller comprises a pair of sub-rollers arranged in a widthwise direction of said widthwise center flat part with a gap corresponding to the widthwise center area of said widthwise center flat part.

12. The method according to claim 8, wherein said slime-like flux comprises a mixture of a fluoride-based flux with a synthetic resin, the amount of said fluoride-based flux being 40 to 70 wt. % of said mixture.

13. The method according to claim 8, wherein said metal plate is bent with a press roller during said bending steps.

14. A method of manufacturing a heat exchange tube comprising:

bending a flat metal plate to thereby form a widthwise center flat part and flanges along widthwise side edges of said widthwise center flat part, said flanges being substantially upright from said widthwise center flat part;

bending said metal plate at two areas of said widthwise center flat part to thereby form a substantially U-shaped cross section;

coating a widthwise center area of said widthwise center flat part with a slime-like flux by a paint roller after said bending steps;

bending said metal plate bent into the substantially U-shaped cross section at said two areas such that the end faces of said flanges are brought into contact with said widthwise center area of said widthwise center flat part coated with the slime-like flux; and heating said metal plate to thereby braze said end faces of said flanges with said widthwise center area of said widthwise center flat part to thereby manufacture the heat exchange tube.

15. The method according to claim 14, wherein said widthwise center flat part is coated with the slime-like flux by rotation of said paint roller in a longitudinal direction of said metal plate.

16. The method according to claim 14, wherein said slime-like flux comprises a mixture of a fluoride-based flux with a synthetic resin, the amount of said fluoride-based flux being 40 to 70 wt. % of said mixture.

17. The method according to claim 14, wherein said metal plate is bent with a press roller during said bending steps.

* * * * *

UNITED STATES PATENT AND TRADEMARK OFFICE
CERTIFICATE OF CORRECTION

PATENT NO.    : 6,412,174 B1  
DATED         : July 2, 2002  
INVENTOR(S)   : Makoto Kouno et al.

It is certified that error appears in the above-identified patent and that said Letters Patent is hereby corrected as shown below:

<u>Title page,</u>
Item [75], correct the first inventor's name to
-- [75]  Inventors:     Makoto Kouno --

Signed and Sealed this

Fifteenth Day of October, 2002

*Attest:*

JAMES E. ROGAN
*Attesting Officer*  *Director of the United States Patent and Trademark Office*